US006862295B1

United States Patent
Stacey et al.

(10) Patent No.: US 6,862,295 B1
(45) Date of Patent: Mar. 1, 2005

(54) ASYNCHRONOUS SCHEDULER

(75) Inventors: David John Stacey, Herts (GB); Simon Daniel Brueckheimer, London (GB); Paul D Welton, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/349,346

(22) Filed: Jul. 7, 1999

(51) Int. Cl.[7] .............................. H04J 3/16; H04L 12/66
(52) U.S. Cl. ...................... 370/466; 370/468; 370/352; 370/353; 370/354
(58) Field of Search ............................... 370/352, 354, 370/356, 465–468, 229–230.1, 395.4, 395.43, 345.6, 374, 395.6, 231, 232, 235, 235.1, 236, 389, 392, 395.1, 395.51, 395.61, 400–401

(56) References Cited

U.S. PATENT DOCUMENTS

| | | | | |
|---|---|---|---|---|
| 5,533,020 A | * | 7/1996 | Byrn et al. ............... | 370/395.4 |
| 5,541,926 A | * | 7/1996 | Saito et al. ............... | 370/474 |
| 5,592,476 A | * | 1/1997 | Calamvokis et al. ........ | 370/390 |
| 5,999,533 A | * | 12/1999 | Peres et al. .............. | 370/395.4 |
| 6,028,860 A | * | 2/2000 | Laubach et al. ........... | 370/395 |
| 6,085,221 A | * | 7/2000 | Graf ...................... | 709/202 |
| 6,094,432 A | * | 7/2000 | Jeong .................... | 370/395.7 |
| 6,115,360 A | * | 9/2000 | Quay et al. .............. | 370/235 |
| 6,256,292 B1 | * | 7/2001 | Ellis et al. .............. | 370/227 |
| 6,469,982 B1 | * | 10/2002 | Henrion et al. ........... | 370/230 |
| 6,470,014 B1 | * | 10/2002 | Ono et al. ............... | 370/395.1 |
| 2003/0223370 A1 | * | 12/2003 | Jain et al. ............... | 370/235 |

OTHER PUBLICATIONS

Kung, Credit–Based Flow Control for ATM Networks, Apr. 1995, IEEE Network, p. 40–48.*
Newton, Newton's Telecom Dictionary, Oct. 1998, Telecom Books, p. 66–67, 261, 324–325, 693, and 731.*

* cited by examiner

*Primary Examiner*—Chi Pham
*Assistant Examiner*—Ronald Abelson
(74) *Attorney, Agent, or Firm*—Barnes & Thornburg LLP

(57) ABSTRACT

An interface arrangement provides interfacing between a frame based telecommunications network in which traffic is transported in frames and an asynchronous network in which traffic is transported in cells or packets. Each TDM frame supports a plurality of data structures each comprising one or more channels. Credits corresponding to bandwidth entitlement are issued at a substantially constant rate and are assigned to the data structures according to the size of those structures by a connection control. Each data structure is accorded a threshold number of assigned credits, and when this number has been reached, the data structure is assembled into cells or packets for dispatch into the asynchronous network.

15 Claims, 2 Drawing Sheets

ASYNCHRONOUS SCHEDULER

FIELD OF THE INVENTION

This invention relates to telecommunications networks and in particular to the scheduling of traffic in such networks.

BACKGROUND OF THE INVENTION

Traditionally, two types of legacy telecommunication networks have been developed. The first type is connection oriented and is used for the transport of narrow band voice traffic, typically carried in TDM frames. Such networks comprise for example synchronous or plesiochronous networks. The second type legacy network is connectionless in nature and is used for the transport of broad band packet or cell-based data traffic. There is currently a drive towards unified networks, which provide end to end transport for both voice and data services. However, as there is a well established voice network base, network operators are naturally reluctant to replace such legacy networks. This issue has been addressed by providing broad band (asynchronous) overlay networks which interface with the established TDM networks to provide a voice and data transport function. At the interface between the two networks, an interface function maps TDM frames into packets or ATM cells and vice-versa. ATM is of course just one example of a packet based network.

A particular problem with such an arrangement is the delay that builds up in the system when multiple packets or cells are scheduled for dispatch together (i.e. payloads that are waiting for transmission whilst other payloads are transmitted). Such delay can occur when packetising synchronous data, for example TDM traffic being packetized into fixed length voice packets such as ATM cell payloads, wherein multiple payloads from multiple data structures may be completed at substantially the same instant. The worst case example of such delay would be if every single data structure was scheduled to dispatch a cell at the same instant, which could occur naturally for example if all ATM VCCs were set up at the same time instant, such that at frame 1 the first octet of data arrives for each structure and forty six frames later (assuming the use of ATM Adaptation Layer 1 single channel adaptation) the last octet to complete the payload for each structure would also arrive. The scheduler then attempts to dispatch every cell instantaneously and a very large back-log is created which can take up to the super-frame period to eliminate (if the transmission bandwidth is equal to the data generation rate)—at which point it builds up again. In this example the super-frame is defined as the forty seven frame interval that it takes to assemble a completed packet.

The process is further complicated by the fact that, although the data samples are generated regularly there may be slight non-synchronization between the transmit and receive function. This results in timing slip which requires appropriate measures for rectification.

SUMMARY OF THE INVENTION

An object of the invention is to minimize or to overcome the above disadvantages.

A further object of the invention is to provide an improved arrangement and method for adapting narrow band traffic into a broad band network.

According to a first aspect of the invention, there is provided a method of interfacing frame based telecommunications traffic from a frame-based network to an asynchronous network, the method comprising mapping the frame-based traffic into cells, and scheduling the dispatch of said cells into the asynchronous network at a substantially constant rate.

According to another aspect of the invention, there is provided an interface device for interfacing frame based telecommunications traffic from a frame-based network to an asynchronous network, the device being arranged to map the frame-based traffic into cells or packets, and incorporating a scheduler for scheduling the dispatch of said cells or packets into the asynchronous network at a substantially constant rate.

According to a further aspect of the invention, there is provided method of interfacing frame based telecommunications traffic in which each frame supports a plurality of data structures from a frame-based network to an asynchronous network, the method comprising;

issuing credits at a substantially constant rate;
assigning the credits to each said data structures according to the size of that data structure;
determining for each said data structure a threshold number of assigned credits; and,
when said threshold value is reached, assembling that data structure into cells or packets for dispatch into the asynchronous network.

According to another aspect of the invention, there is provided an interface arrangement for interfacing frame based telecommunications traffic in which each frame supports a plurality of data structures each comprising one or more channels from a frame-based network to an asynchronous network in which traffic is transported in cells or packets, the method comprising;

means for issuing credits at a substantially constant rate;
means for assigning the credits to each said data structures according to the size of that data structure; and
means for determining for each said data structure a threshold number of assigned credits whereby, when said threshold value is reached, the data structure is assembled into cells or packets for dispatch into the asynchronous network.

According to a further aspect of the invention, there is provided method of scheduling dispatch of a TDM data structure packetized into cells or packets for dispatch into an asynchronous network, the method comprising allocating credits to the data structure at a predetermined rate, comparing the accumulated total of credits for said data structure, and, when said total reaches a predetermined threshold, dispatching said cells into the asynchronous network.

The scheduler device has the capability of scheduling between multiple sources, referred to as a data structures, whereby the scheduling of a data packet for a single data structure is governed entirely by its rate of data generation. The resultant scheduling operation ensures both a fair allocation of bandwidth between the multiple sources and that the traffic generated by the process is evenly distributed about the periodic time intervals of data generation. Further, for each data structure the scheduler can be flexibly configured to dynamically vary the rate of packet generation to accommodate any changes in the data structure size.

The scheduler has applicability to any application which requires the scheduling of multiple data structures onto a shared transmission medium. It is optimized for the scheduling of data packets that are generated by a regular process i.e. each data packet for a data structure is assembled through the periodic arrival of a number of data samples. The regular period at which data samples arrive is referred to as the frame rate. Whilst optimized for the scheduling of regular data packets the device has the capability of increasing or decreasing its rate of generation in response to an external stimulus. In general this external stimulus is applied to the scheduler to adjust the rate to take account of the minor timing differences that can occur between transmit and receiving devices within a data network.

The data generated for each data structure is transmitted as a series of data packets of a predetermined length. Each data packet is generated by the arrival of regular data samples from one or more data channels. A single data structure therefore consists of a number of data channels whereby each data channel will generate a data sample at each frame period. Thus a data structure consisting of two channels will generate a data packet twice as quickly as a data structure made up of just one data channel. The scheduling device must determine when a data structure has sufficient data to form a packet and then schedule the transmission of the packet onto the shared medium at an appropriate time. For optimum performance the scheduler ensures that there is an even (substantially random) distribution of scheduled data both within the data frame period and also within any higher-level framing structure that exists. The term super-frame is used herein to denote the higher level timing structures that occur in the assembly and generation of data packets. For example, if 10-octet data packets were used, then the filling of a packet would require the arrival of 10 data samples per data structure. Thus, in this process a 10-frame super-frame structure is imposed upon the base data sampling interval. The substantially random distribution of scheduled data packets both within a data frame and within a super-frame minimises the bunching of scheduled data packets within the system which, in turn, minimises the build-up of scheduling delay.

A specific example of an application for the scheduler device is in the scheduling of ATM cell payloads in an ATM adaptation or interface device that is used for the process of adapting synchronous data samples (for example voice data) to the asynchronous ATM domain. In such a device, each ATM VCC is used to transport a single data structure that consists of one or more data channels. The ATM payload for such a function will consist of a number of periodic data samples together with any associated additional control information associated with the adaptation method. At each frame interval, (for example 125 us in the case of 64 kb/s PCM) each data channel generates a single octet of information (a voice sample). The ATM VCC may be used to transport a single data channel (such a process is known as Single Channel Adaptation {SCA}), or alternatively multiple data channels (known as Multiple Channel Adaptation {MCA}). For MCA the data samples generated for several data channels are multiplexed together at each frame interval to form a regular structure that is then assembled into the payload of the VCC. Irrespective of whether the MCA or SCA method is used the scheduler process determines when sufficient data has been generated to enable the dispatch of an ATM cell payload. In doing this it takes account of the number of associated control octets that are also transferred in the payload space which typically may change on a cell-by-cell basis.

In the example of 64 kb/s voice traffic being adapted into AAL1, the frame interval is 125 us. If an SCA process is used then the super-frame period is equal to 47 frames (5.875 ms). The scheduler ensures that there is an even distribution of the number of data structures that schedule a cell for dispatch within each of the 47 frames of the super frame; and within each frame those cells scheduled for dispatch are substantially evenly spread across the 125 us frame interval.

BRIEF DESCRIPTION OF THE DRAWINGS

An exemplary embodiment of the invention will now be described with reference to the accompanying drawings in which.

DETAILED DESCRIPTION OF PREFERRED EMBODIMENTS

Figure 1:
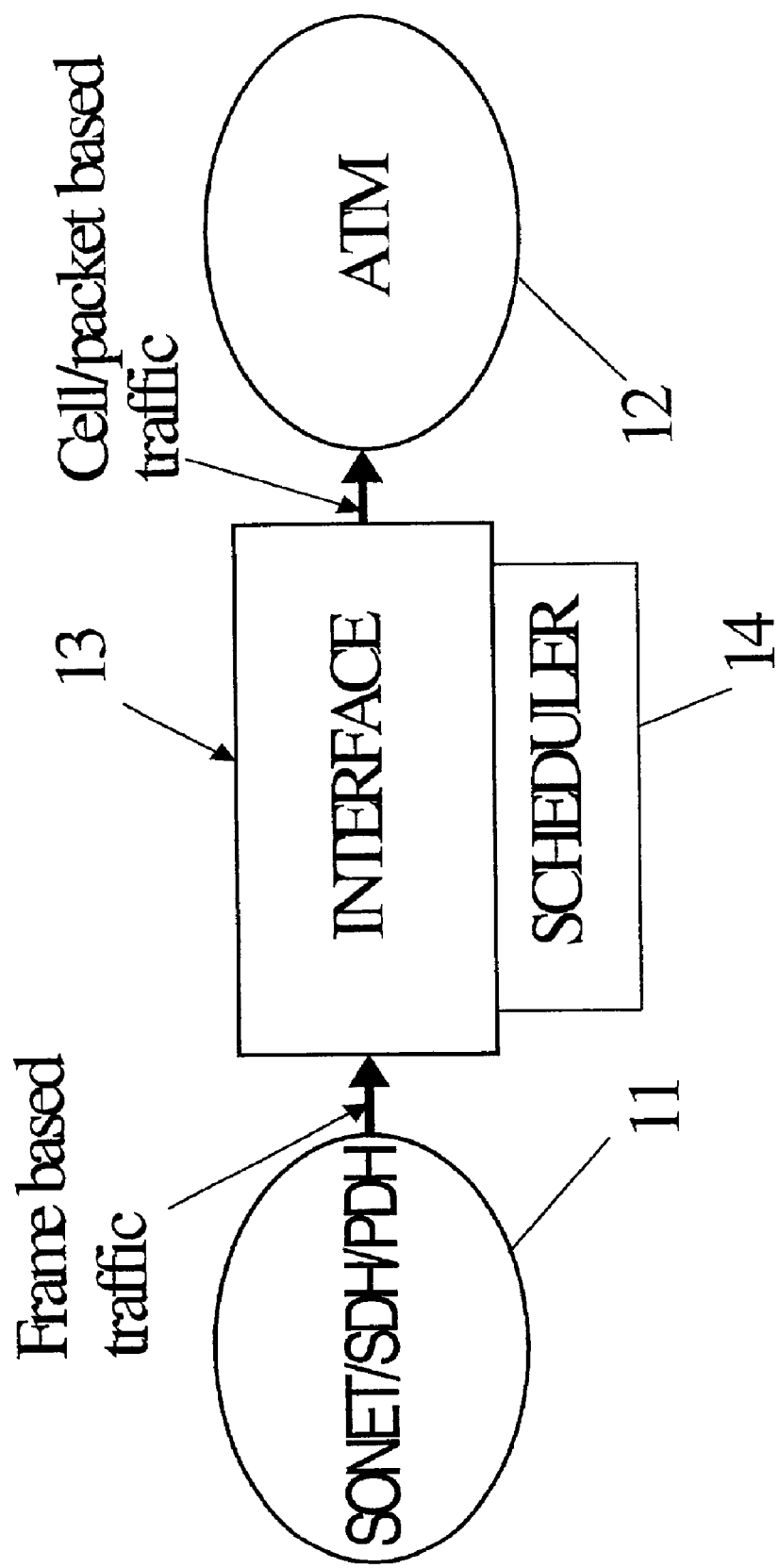
FIG. 1 is a schematic diagram illustrating the principle of traffic scheduling at an interface between a synchronous and an asynchronous network.

Referring first to FIG. 1, this illustrates the principles of traffic scheduling at the interface between a frame based network 11, e.g. a synchronous or plesiochronous TDM network, and an asynchronous network 12 in which traffic is transported in cells or packets. An interface function 13 incorporating a scheduler 14 provides a mapping of the frame-based TDM traffic into ATM cells. The function of the scheduler is to control the dispatch of cells into the asynchronous network so as to dispatch the cells at a substantially constant rate irrespective of the 'bursty' nature of the traffic.

Figure 2:
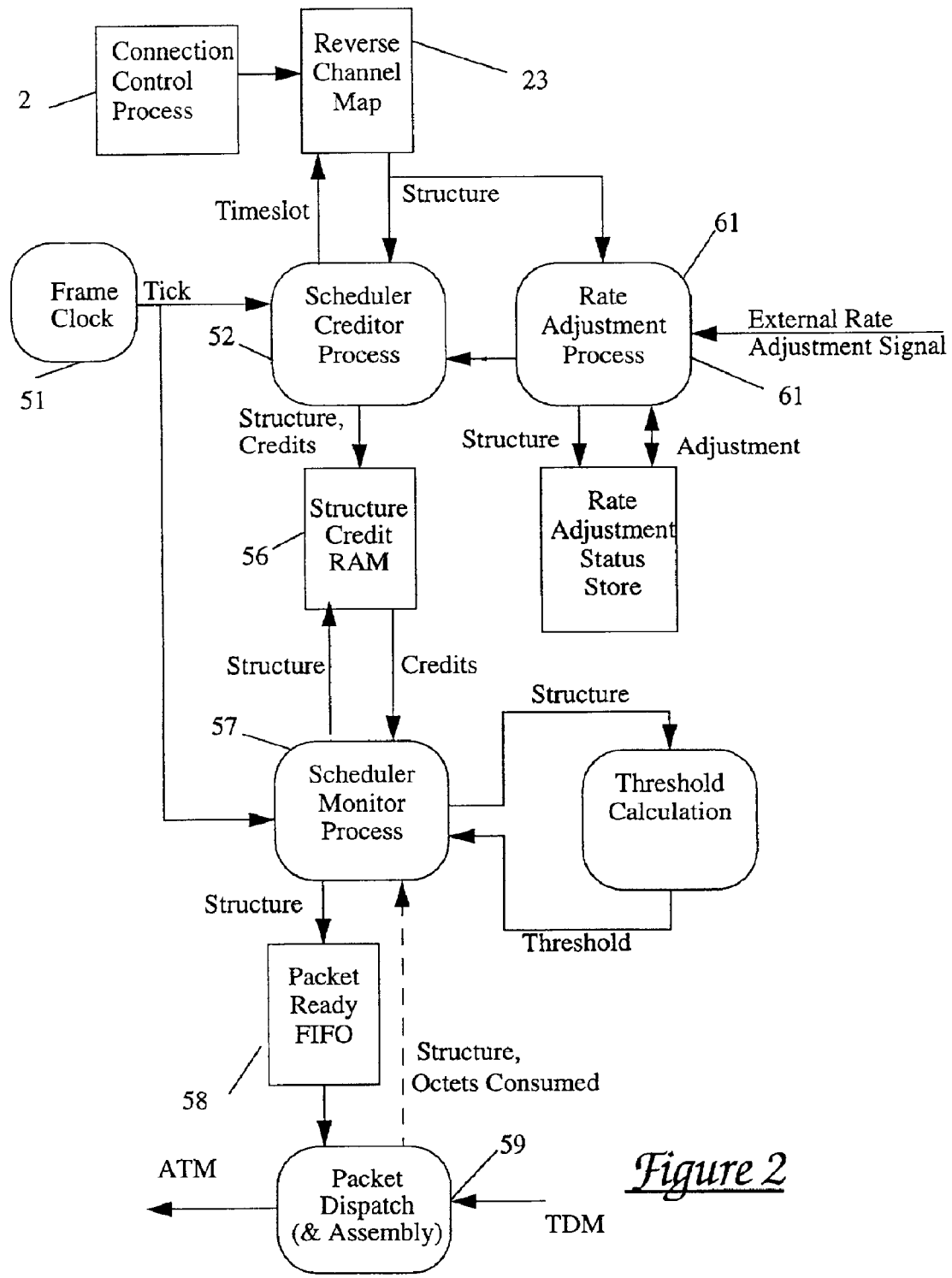
FIG. 2 shows the construction of the scheduler employed in the interface of FIG. 1.

The construction and operation of the traffic scheduling device is illustrated in FIG. 2. The scheduler is implemented using a number of processes that are controlled through the provisioning of a number of data maps, typically implemented as RAM structures. The key scheduler processes and RAM structures are described below.

A Frame Clock 51 is used to provide the synchronous timing mechanism required to control the scheduler process. Typically the clock is be used to provide two levels of timing control, the frame signal and the intra-frame timing signal, here referred to as a tick. The frame signal as its name implies is used to provide a periodic framing signal. For example, in the case of PCM voice this framing signal would be generated once every 125 $\mu$s corresponding to the frame rate. The intra-frame timing signal or tick is used to provide timing within the frame, the resolution of the tick being at least equal to the number of synchronous data channels supported by the device. For example a scheduler designed to schedule the assembly of 8000 synchronous data channels into a number of data packet structures would require at least 8000 ticks per frame. In reality the number of ticks may be set to slightly larger than the number of synchronous data channels, the additional 'ticks' providing tolerance or slack within the basic scheduling algorithm to enable housekeeping and other control tasks to be interleaved within the basic scheduling algorithm.

The scheduler creditor process 52 performs one complete cycle of operation every frame. Its function is to issue 'credits' to each data structure in proportion to that structure's rate of data generation. Thus, for example, a data structure consisting of two synchronous data channels would be issued two credits per frame, one consisting of four data channels would be issued four credits and so on. A credit can be considered as an entitlement to occupy a portion or share of the network bandwidth.

The rate of generation of credits and the intervals within the frame period at which each credit is issued is determined by a reverse channel map 53. The reverse channel map contains one location of memory per synchronous data channel supported by the scheduler device. Thus in the 8000 channel example the table would contain 8000 channels. Each location of the map contains the identity of the data structure to be credited. The scheduler creditor process 52 reads the map in a cyclic manner driven by the frame clock ticks so that each location of the map is read exactly once per frame.

A connection control process 55 is used to configure and control the reverse channel map 53. At scheduler initialization, all locations within the map 53 are set to null to indicate that there is nothing at present to schedule. To begin scheduling the assembly of a data structure the connection control process 55 assigns credits to that data structure by writing its identity into free locations in the map 53. The number of locations, i.e. credits, assigned to the data structure is directly proportional to its data rate. The locations that are assigned to the data structure dictate, within the frame interval the timing distribution for the assembly of its credits. Therefore the algorithm that the connection control process uses to assign free locations to a data structure will dictate the scheduling distribution for that structure. The scheduler process described will support any chosen algorithm for this process. The appropriate algorithm may thus be selected to suit the desired timing solutions for a particular application. Potential options for the allocation of free slots include but are not limited to the following.

The connection control process 55 uses a substantially random process to allocate free slots to the data structures. Particularly for large data structures where the number of data channels is greater than the nominal packet size, this will tend to ensure overall a random scheduling of packets within the frame interval and thus provides an effective mechanism to limit jitter.

The connection control process allocates the data location that directly corresponds to the data channel forming part of the data structure. For example, if data structure 1 consists of channels 7, 14, 28 and 29 then locations 7, 14, 28 and 29 are written with the value 1 to assign them to that data structure.

Locations are allocated to a data structure in a contiguous manner.

Irrespective of the method of allocation, the connection control process retains a record of which locations are assigned to which data structures and which locations are free. To tear-down a connection the control process simply sets the assigned locations back to null and places those locations into its free pool. To modify the rate of a connection the control process assigns additional free locations to the structure or removes a number of the locations already assigned to it.

As the scheduler creditor process 52 reads each location of the reverse channel map it credits the appropriate data structure. The structure credit RAM 56 is used to maintain a record of the number of outstanding credits assigned to each data structure. The RAM 56 contains one location per data structure. In normal operation for each new credit the scheduler creditor 52 will increment the number of assigned credits to the data structure by one. Occasionally due to the rate adjustment process to be described below, the number of credits issued may be modified.

The structure credit RAM 56 provides the mechanism for interaction between the creditor process 52 and the scheduler monitor process 57. The scheduler monitor process 57 visits each location of the credit RAM 56 in turn. The complete structure credit RAM is read by the monitor process 57 at least once per frame—although to decrease the overall processing delay through the system this rate may be increased. For each location in the credit RAM 56, the number of currently allocated credits for that data structure is read and compared to a per structure threshold. This threshold is set to equal the number of data samples required to assemble a data packet for that structure.

If sufficient credits exist for that structure, then the dispatch of a packet for that structure is scheduled by placing the data structure identifier into a packet ready FIFO 58 which is used to maintain a list of scheduled, but not yet assembled, events. The use of such a FIFO enables de-coupling of the monitor process 57 from the subsequent packet assembly and dispatch processes 59. This allows for the inevitable instances where over a short time period the nominal scheduling rate is greater than either the assembly or dispatch rates. If the packet ready FIFO 58 ever becomes full (a very rare statistical event if sized properly according to the expected traffic distributions) then the FIFO may apply a temporary flow control signal to halt the monitor whilst the backlog is cleared.

There are two options for the removal of credits from the structure credit RAM. In the first approach, the scheduler monitor process 57 immediately decrements the credit RAM, when it schedules the transmission of a packet, by writing an entry into the packet ready FIFO 58. The monitor 57 then decrements the relevant location in the structure credit RAM 56 by the number of data octets that were needed to assemble the scheduled data packet. In this approach the monitor 57 will immediately begin the process of re-monitoring that data structure to enable it to schedule another data packet for that structure as soon as the credit threshold is next met. Under such a mechanism, dependent on the depth of the packet ready FIFO and the current traffic distribution, it is possible that multiple events for a single structure are scheduled concurrently within the FIFO.

Alternatively, the scheduler can be restricted to scheduling one event per structure at any instant. To do this, when the credit threshold is first exceeded for a data structure, that event is scheduled to the FIFO 58 as normal. In addition an event scheduled flag is set in the scheduler credit RAM 56 for that structure. The event scheduled flag will remain SET in the RAM 56 until the event reaches the top of the FIFO 58 and the packet is assembled and dispatched by the packet assembly and dispatch process 59. A signal is sent back from the packet assembly & dispatch process and the event scheduled flag is then RESET. At this point the monitor process 57 may again schedule an event for that structure once the appropriate threshold is met.

In this second approach new credits may well arrive for a data structure during the time it takes for the scheduled packet to reach the top of the FIFO queue. In certain applications, by enabling access to the credit RAM to the packet assembly & dispatch process it is possible to schedule some of these additional data octets. For example in an application where a variable length data packet is used—the scheduler being setup to schedule an event when a minimum packet size is reached —this approach enables all the octets that arrived to be assembled at the point of dispatch. In such an application the packet dispatch & assembly process must also indicate to the monitor process how many data octets it has consumed.

Irrespective of the approach used to schedule an event upon decrementing the number of credits consumed by the data structure the threshold calculation process 60 calculates the number of octets required to trigger the threshold of the next packet for that structure. This function is service specific and tailored to the data packet protocol being used to transmit the data for that structure. Typically the new threshold will be a function of some of the following:

Protocol Type

Packet Length

Packet Sequence Number

For example, if using AAL1 Structured Data Transfer (SDT) to transmit a data structure consisting of multiple data channels then the payload length (packet length) is fixed at forty eight, but dependent on the cell sequence number either one or two octets of the payload are used to send control information. Thus the resultant threshold will be set to forty seven or forty six octets.

To distribute the generation of completed data packets about the super-frame, two methods can be used. Either the control process when establishing a new data structure sets it up in a given frame (either random or a fixed phase) or the threshold calculation process can alter the nominal threshold for the first data packet to occur in the chosen frame.

The packet dispatch and assembly process 59 (SDU dispatch process) is again a process that is tuned to the protocol being supported. In general its function is to service the events scheduled at the head of the packet ready FIFO. Typically for each event the process will assemble the data packet (data samples plus associated control information) and transmit the assembled packet onto the transmission medium. In certain applications the assembly of the data samples will be controlled by the use of a connection map that identifies the data channels that are associated with a particular data structure.

The final process to be described is the optional rate adjustment process 61 which enables the rate of the scheduler to be occasionally adjusted, typically to compensate for minor frequency differences between the transmit and receive functions within the network. One example of such a function is Circuit Emulation Service in AAL1 where although the ATM adaptation equipment is nominally locked in frequency to the TDM circuit equipment, frequency differences will occur which the ATM adaptation equipment must track. Again the exact functionality of the rate adjustment process will be dependent on application. Here however a general description of the process is given. The rate adjustment process is controlled by an external control signal. Typically this signal will identify the amount of rate adjustment (in data samples either positive or negative) and the identity of the 'structure' to be adjusted. This identification may either identify a data structure, group of data structures or an individual data channel. Irrespective of the method of identification the rate adjustment process stores these adjustments into a rate adjustment status store 62. The rate adjustment status store is typically organized to provide one location per data structure. The rate adjustment process decodes the external rate adjustment signal and determines to which of the data structures the adjustment applies to and stores the adjustment values into the appropriate data locations. As the creditor process accesses the reverse channel map to gain the identity of the data structure being credited, the data structure identification can also be applied to the rate adjustment status store 62 via the rate adjustment process 61 to determine if an adjustment is required for that structure. If there is, this is transmitted to the scheduler credit process and the location in the rate adjustment store is reset.

The technique can be extended to enable packets to be scheduled and dispatched in partial fragments. I.e. a nominal fragment size x is chosen such that each data packet is scheduled as n−1×byte fragments plus an n'th fragment of nominal size up to x to complete the data packet. This has the potential application of enabling the packet assembly or adaptation process to be distributed. One such example is an adaptation chip suite (ACS) consisting of a number of SSCS parts, providing service specific adaptation capability, plus a CPS part that is used to multiplex the completed packet payloads together onto a single bearer. To support the multiplex function the CPS part must sport a large payload memory area which can also be reused for the packet assembly process by distributing the assembly function.

To enable this all that is necessary is to modify the threshold calculation process to take account of the fragment size such that it sets the threshold equal to the number of octets required to assemble a fragment, taking account of any control octets, of size x for the n−1 fragments and up to x for the n'th (last) fragment of a packet.

In the above example of PCM voice transport, each channel generates one eight-bit sample of voice per 125 us frame. However compression techniques can also be used that effectively reduce the sample rate to less than 8 bits/sample. To enable the scheduler to support a mixture of sub-rate and full rate services it is simply necessary to modify the nominal thresholds of the sub-rate services. For example at 4 bits/sample a 10 byte packet would be scheduled by setting the monitor threshold to 20. In this way, for each frame the creditor process can still increment the credits by 1 for that data structure. This enables the scheduling of full rate and sub-rate services to be scheduled concurrently using the same process.

It will be understood that the above description of a preferred embodiment is given by way of example only and that various modifications may be made by those skilled in the art without departing from the spirit and scope of the invention.

What is claimed is:

1. A method of interfacing frame based TDM telecommunications traffic in which each TDM frame supports a plurality of data structures each comprising one or more channels from a frame-based TDM network to an asynchronous network in which traffic is transported in cells or packets, the method comprising;

issuing credits at a substantially constant rate;

assigning the credits to each said data structure according to the size of that data structure;

determining for each said data structure a threshold number of assigned credits; and, when said threshold value is reached, assembling that data structure into cells or packets for despatch into the asynchronous network.

2. A method as claimed in claim 1 wherein said credits are assigned via a connection control.

3. A method as claimed in claim 2, wherein said connection control assigns credits to a data structure by writing the identity of that data structure into free locations in a reverse channel map.

4. A method as claimed in claim 3, wherein said credit assignments are stored in a random access memory having memory locations one for each TDM channel.

5. A method a claimed in claim 4, wherein said credits are issued in cycles corresponding to the TDM frame period.

6. A method as claimed in claim 5, wherein the rate of issuance of credits is greater than the TDM channel rate.

7. A method a claimed in claim 6, wherein said asynchronous network is an ATM network.

8. An interface arrangement for interfacing frame based TDM telecommunications traffic in which each TDM frame supports a plurality of data structures each comprising one or more channels from a frame-based TDM network to an asynchronous network in which traffic is transported in cells or packets, the interface arrangement comprising:

means for issuing credits at a substantially constant rate;

means for assigning the credits to each said data structures according to the size of that data structure; and means for determining for each said data structure a threshold number of assigned credits whereby, when said threshold value is reached, the data structure is assembled into cells or packets for despatch into the asynchronous network.

9. An interface arrangement as claimed in claim 8, wherein said credit assignment means comprises a connection control.

10. An interface arrangement as claimed in claim 9, wherein said connection control assigns credits to a data structure by writing the identity of that data structure into free locations in a reverse channel map.

11. An interface arrangement as claimed in claim 10, wherein said credit assignments are stored in a random access memory having memory locations one for each TDM channel.

12. An interface arrangement as claimed in claim 11, and incorporating means for adjusting the rate at which credits are issued by the credit issuing means.

13. An interface arrangement as claimed in claim 12, and incorporating a clock having a first clock rate corresponding to the TDM frame rate and whereby the credit issuing means issues said credits on a cyclic basis.

14. An interface arrangement a claimed in claim 13, wherein said clock has a second clock rate corresponding to the channel rate of said TDM frames, said second lock rate providing a timing signal for said credit issuing means whereby said credits are issued at a rate at least equal to the channel rate.

15. A method of scheduling despatch of a TDM data structure packetized into cells or packets for despatch into an asynchronous network, the method comprising assigning credits to the data structure in accordance with the size of said data structure, comparing an accumulated total of credits assigned to said data structure, and, when said total reaches a predetermined threshold, despatching said cells into the asynchronous network at a substantially constant rate.

* * * * *